Oct. 4, 1932.  C. SCHAEFFER  1,880,986
CHANGE SPEED GEAR BOX
Filed Feb. 26, 1931

C. Schaeffer
INVENTOR

By: Marks & Clerk
ATTYS.

Patented Oct. 4, 1932

1,880,986

UNITED STATES PATENT OFFICE

CHARLES SCHAEFFER, OF PARIS, FRANCE, ASSIGNOR TO SOCIETE ANONYME DES ANCIENS ETABLISSEMENTS PANHARD & LEVASSOR, OF PARIS, FRANCE

CHANGE SPEED GEAR BOX

Application filed February 26, 1931, Serial No. 518,548, and in France March 22, 1930.

This invention has for its object a change speed gear box for four speeds and reverse and back drive, so devised as to present only a reduced length or to allow the use of wider pinions for the same length of the gear box. According to a known arrangement, this gear box comprises two series of pinions arranged in two parallel lines, and sliding clutch sleeves serving to couple these pinions with each other according to different combinations.

According to the present invention, two clutch sleeves are sufficient for obtaining the four speeds for forward drive, owing to the fact that the sleeve arranged in alignment with the driving and driven shafts carries, on both sides, pins which pass through slots provided in the two pinions adjacent to this sleeve and which can alternatively enter notches provided in the two pinions located beyond the preceding ones.

A form of construction of gear box thus devised is illustrated, by way of example, in the accompanying drawing.

Figure 1:
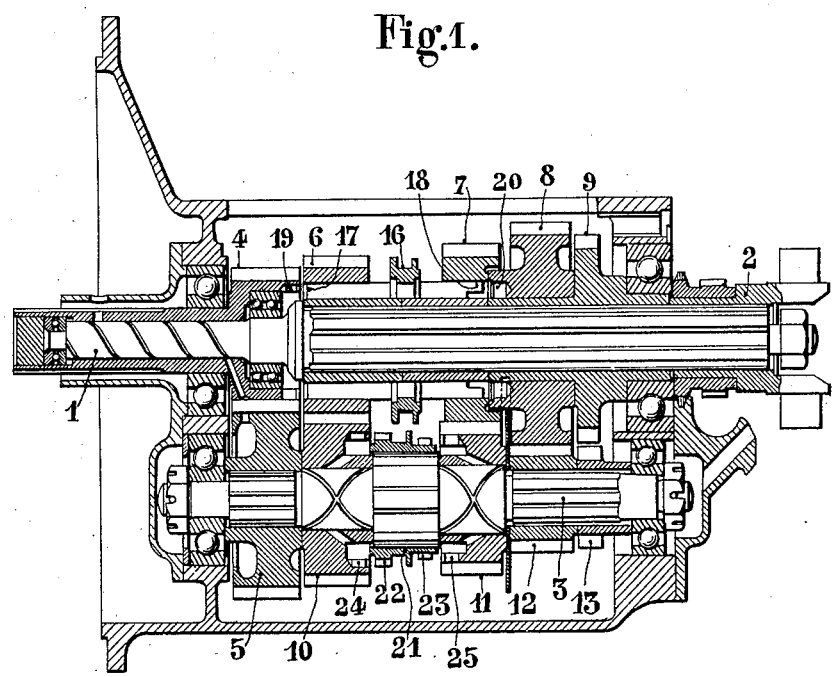
Fig. 1 is a longitudinal section of this gear box, in the disengaged position.
Figure 2:
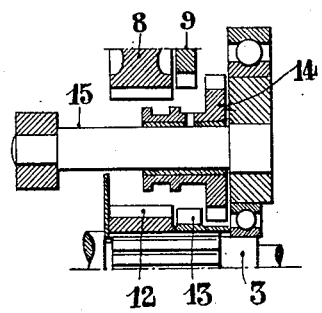
Fig. 2 is a section of the intermediate pinion for reverse drive.

1 designates the driving shaft, 2 the driven shaft, and 3 the counter-shaft.

The shaft 1 carries a pinion 4 gearing with a pinion 5 keyed on the counter-shaft, so that the latter constantly rotates with the driving shaft, at a smaller speed.

On the driven shaft are mounted pinions 6, 7, 8, 9, the pinion 8 being loosely mounted and the other pinions being keyed on the said shaft.

On the counter-shaft 3 are mounted pinions 10, 11, 12, 13, respectively arranged opposite the preceding ones, the first two pinions being loosely mounted and the last two being keyed on the counter-shaft.

The three pairs of pinions 6, 10-7, 11 and 8, 12 are directly in gear, whilst the pinions 9 and 13 for reverse drive are coupled only through the medium of a sliding pinion 14 movable along a fixed spindle 15. Between the pinions 6 and 7 is arranged a sleeve 16 sliding on the smooth hubs of these pinions and carrying, on both sides, pins 17 and 18 which pass through corresponding slots of the said pinions and the ends of which can alternatively enter notches 19 and 20 of the pinions 4 and 8. On the other hand, a sliding sleeve 21 is slidably keyed on the shaft 3 between the loose pinions 10 and 11 and carries, on both its faces, teeth 22, 23 which can alternatively enter notches 24, 25 provided in these pinions.

In the disengaged position illustrated in the drawing, the rotation of the driving shaft is transmitted through 4 and 5 to the shaft 3, sleeve 21, pinions 12 and 13 and loose pinion 8. The shaft 2 is therefore not driven.

If the sleeve 21 is moved to the left, the teeth 22 enter the notches of the pinion 10 which is then driven and, through the medium of the pinion 6, compels the shaft 2 to rotate at the 3rd speed.

If, on the contrary, the sleeve 21 is moved to the right, its teeth 23 enter the notches of the pinion 11 and the latter, through the medium of the pinion 7, compel the driven shaft to rotate at the 2nd speed.

If the sleeve 21 is left at dead centre and the sleeve 16 is moved to the right, the pins 18 enter the notches of the pinion 8, and as the latter is constantly driven by the pinion 12, its rotation is transmitted by the pins and pinions 6 and 7 to the shaft 2; the 1st speed is thus obtained.

If the sleeve 16 is moved not to the right but towards the left, the pins 17 enter the notches of the pinion 4 and then transmit the rotation of the driving shaft to the pinions 6, 7 and, consequently, to the shaft 2; it is the direct drive.

When both sleeves 16 and 12 are at dead centre, the reverse drive is obtained by causing the sliding pinion 14 to come in engagement with the pinions 13 and 9.

It will be understood that the details of construction of the various parts, the arrangement for mounting the shafts in the gear box, the nature of the pinions, etc. can be varied without departing from the scope of this invention.

It is to be noted that the arrangement described allows of utilizing helical pinions having wide and low teeth.

The cylindrical as well as the plane friction surfaces of the pinions will preferably be babbited, that is to say covered with a thin layer of antifriction metal.

The pins 17, 18, instead of being secured on the sleeve 16, as illustrated, can be made in one piece with it.

I claim:

1. Change speed gear box for four speeds, comprising two shafts in alignment, one a driving shaft, the other a driven shaft, a counter shaft parallel to the preceding shafts, a pinion secured on the driving shaft, a pinion secured on the counter-shaft and gearing with the preceding pinion, two pinions loosely mounted on the counter-shaft, a sleeve sliding on a key on the said counter-shaft between the two said loose pinions and having claws in order to be alternatively coupled with these two pinions, two other pinions keyed on the driven shaft, these pinions respectively gearing with the said loose pinions on the counter-shaft and having transverse slots, a sleeve sliding between the said keyed pinions and having side pins sliding through the slots of the said keyed pinions, another pinion secured on the counter-shaft, a pinion loosely mounted on the driven shaft, this latter loose pinion and the said pinion secured on the driving shaft being respectively arranged near the two pinions keyed on the driven shaft and adapted to be alternatively engaged by the respective ends of the pins of the sleeve sliding on the driven shaft.

2. Change speed gear box comprising two shafts in alignment, one a driving shaft, the other a driven shaft, a counter shaft parallel to the preceding shafts, a pinion secured on the driving shaft, a pinion loosely mounted on the driven shaft, two pinions secured to the counter shaft respectively gearing with the two first pinions, two pinions loosely mounted on the counter shaft between the two pinions secured on the counter shaft, means to couple alternatively said pinions with the counter shaft, two pinions keyed on the driven shaft, said pinions respectively gearing with the two pinions loosely mounted on the counter shaft and having transverse slots, a sleeve able to slide between the said keyed pinions and having side pins constantly engaged in the slots of the said keyed pinions and able to slide through these pinions, the pinion secured on the driving shaft and the pinion loosely mounted on the driven shaft having side notches adapted to be respectively and alternatively engaged by the ends of said pins.

In testimony whereof I have hereunto affixed my signature.

CHARLES SCHAEFFER.